Feb. 17, 1970  M. SMITH  3,495,636
AUTOMATIC ROUTING MACHINE
Filed Dec. 29, 1967  3 Sheets-Sheet 1

INVENTOR.
MARION SMITH
BY Sanford Schnurmacher
ATTORNEY

INVENTOR.
MARION SMITH
BY
Sanford Schuurmacher
ATTORNEY.

INVENTOR.
MARION SMITH
BY
ATTORNEY.

United States Patent Office 3,495,636
Patented Feb. 17, 1970

3,495,636
AUTOMATIC ROUTING MACHINE
Marion Smith, Maple Heights, Ohio, assignor to The Sam Palevsky Hardware Company, Bedford Heights, Ohio, a corporation of Ohio
Filed Dec. 29, 1967, Ser. No. 694,703
Int. Cl. B27c 5/02
U.S. Cl. 144—144            4 Claims

ABSTRACT OF THE DISCLOSURE

An automatic router for cutting completely enclosed sink bowl openings in counter tops.

---

Conducive to a better understanding of the invention, it may be well to point out that the installation of sink bowls in counter tops requires that an opening be cut in the counter top whose contour closely follows that of the rim of the sink bowl, so that a water-tight seal can be established between the bowl and the counter top. In the case of rectangularly shaped bowls the opening must be curved at the four corners, to provide a pleasing, free flowing, appearance. Heretofore, the cutting of such an opening took about 10 to 15 minutes, as well as requiring constant attention and considerable skill on the part of the workman.

The primary object of this invention, therefore, is to provide an automatic routing machine that will cut a completely enclosed sink bowl opening in a counter top in approximately 38 to 44 seconds, depending on the size of the opening and the hardness of the material, without requiring any attention on the part of the workman.

Another object, is to provide a machine of the type stated whose cutting tool path is automatically guided by a template.

Another object, is to provide a machine of the type stated having inter-changeable templates, so that openings of any desired size and shape may be cut.

A further object is to provide a machine of the type stated whose cutting speed and linear advance is automatically responsive to variations in the hardness of the material being operated upon.

These and other objects of the invention will become apparent from a reading of the following specification and claims, together with the accompanying drawing, wherein like parts are referred to and indicated by like reference numerals, and wherein:

Figure 1:
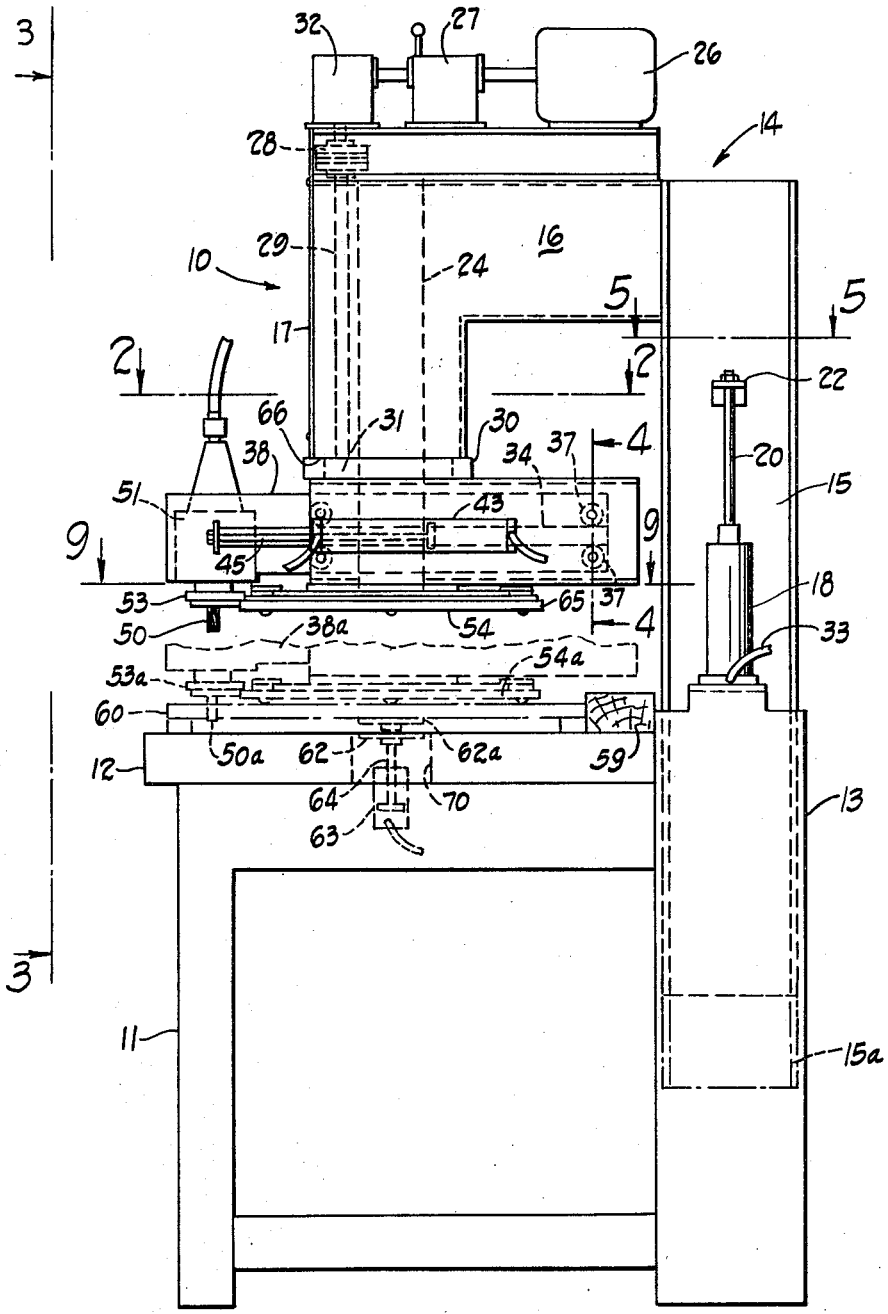
FIGURE 1 is a side elevational view of the automatic routing machine, showing the cutting tool in alternate operational and non-operational positions.

Referring more particularly to the drawing, there is seen in FIGURE 1 the automatic routing machine, that is the subject of the invention, broadly indicated by reference numeral 10.

The machine has a base frame 11, with a vertically extending square hollow column 13 mounted centrally of its rear edge and a horizontally extending work-piece supporting table 12, positioned cross-wise of the column 13.

Reference numeral 14, broadly indicates an inverted U-shaped bracket, mounted cross-wise of the table, with its rear arm 15 telescopically fitted in the column 13 and its forward arm 17 centered over the table 12. The arms 15 and 17 being joined through a horizontal section 16.

Figure 5:
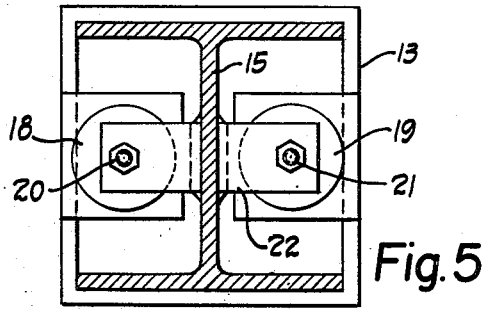
FIGURE 5 is a horizontal sectional view taken along the line and in the direction of the arrows 5—5 of FIGURE 1.

A pair of pneumatic cylinders 18 and 19 are mounted on the column 13, with their piston rods 20 and 21, respectively, connected at their outer ends to the anchor plate 22 of the telescopically mounted bracket arm 15, as seen in FIGURES 1 and 5.

The cylinders 18 and 19 can be activated to reciprocate the bracket arm 15 vertically in the column 13, thereby causing the forward bracket arm 17 to be raised or lowered relative to the surface of the table 12, as seen in FIGURE 1.

Reference numeral 24 indicates a fixed, vertically extending, cylindrical post, or axle, mounted inside the bracket arm 17, and extending beyond the lower edge 66 thereof. A flat bearing, or thrust plate, 25, is mounted at the lower end of the post 24.

Figure 4:
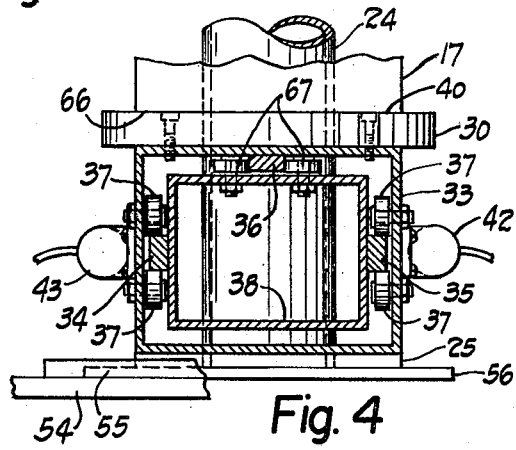
FIGURE 4 is a vertical sectional view, taken along the line and in the direction of the arrows 4—4 of FIGURE 1.

Reference numeral 33 indicates a rotating hollow carriage journaled on the fixed post 24 at the lower end thereof, as is seen most clearly in FIGURE 4.

The carriage 33 is rectangular in cross-section, with aligned bores centered in its upper and lower walls, through which the post 24 passes, in the manner of axle and bearings.

A ring gear 30, having internal teeth, is mounted on top of the upper wall, at the bearing bore, by means of a series of bolts 40.

The upper surface of the ring gear 30 rides against the lower edge 66 of the bracket arm 17, while the lower wall of the carriage rests on the post thrust plate 25. Thus the surfaces 66 and 25 act as thrust bearing surfaces, to hold the carriage 33 against vertical movement on the post 24, while at the same time permitting free rotation of the carriage 33 in a horizontal plane, having the post 24 as its center of rotation.

A series of paired, opposed, and spaced rollers 37 are mounted longitudinally of the inner side walls of the carriage, and a longitudinally extending guide rail 36 is mounted on the inner face of the top wall, between the rear end thereof and the post 24.

Reference numeral 38 indicates a boom, telescopically mounted within the carriage 33, for reciprocal horizontal movement longitudinally thereof. The boom 38 has two guide rails, 34 and 35, mounted on the outer surfaces of its side walls, which ride between the carriage rollers 37; and a pair of opposed rollers 67, at the rear of the inner surface of its top wall, which engage the carriage guide rail 36.

Longitudinally extending slots 39 are cut in the upper and lower walls of the boom 38 through which the post 24 passes, and which enable the boom 38 to clear the shaft 24 as it is reciprocated in the carriage 33.

Figure 2:
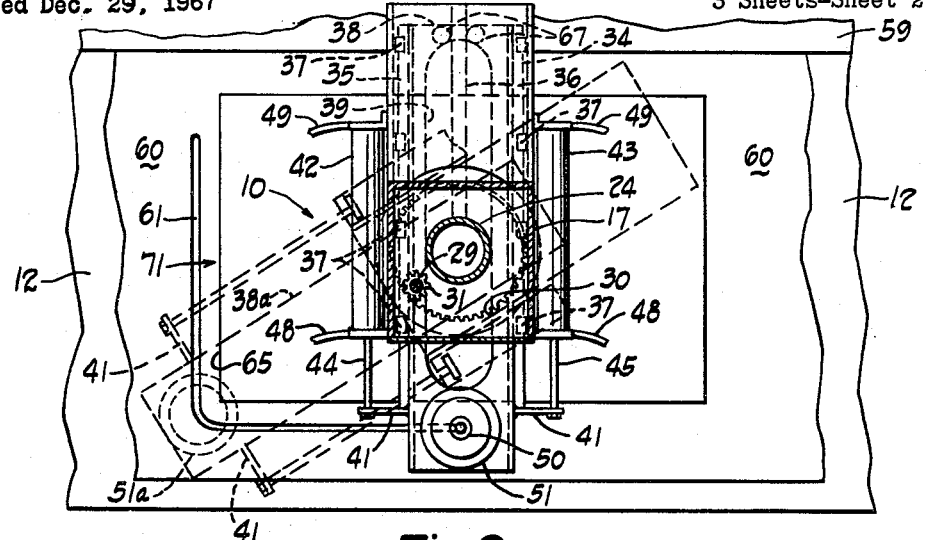
FIGURE 2 is a horizontal view, partly in section, taken along the line and in the direction of the arrows 2—2 of FIGURE 1, showing the cutting tool in alternate positions, during its slot cutting cycle.
Figure 3:
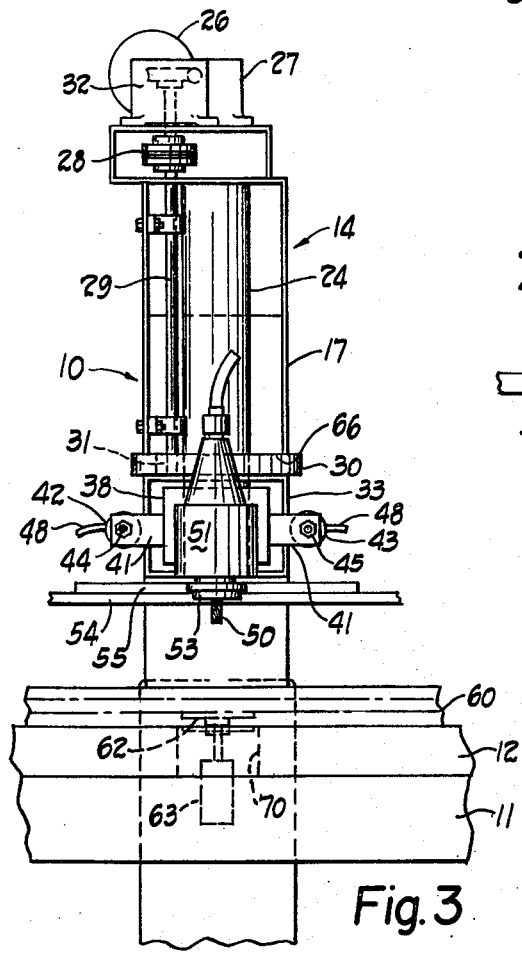
FIGURE 3 is a front elevational view of the automatic routing machine illustrated in FIGURE 1, with portions of the work-piece and supporting table broken away.

Reciprocating movement of the boom 38 is effected by two pneumatic cylinders 42 and 43 mounted in tandem on the carriage, with their piston rods 44 and 45, respectively, connected to an anchor plate 41 at the forward end of the boom 38, as seen in FIGURE 2.

Figure 6:
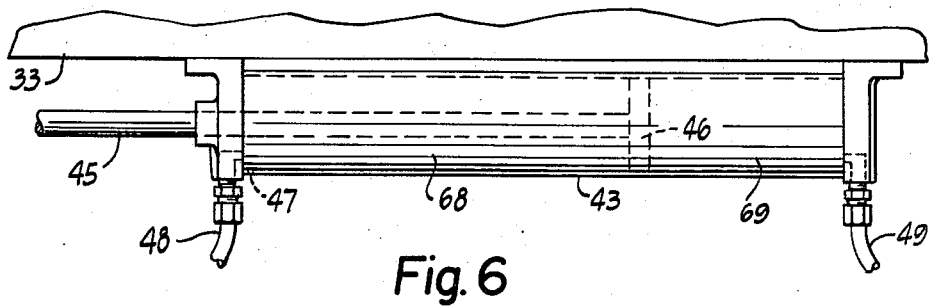
FIGURE 6 is a top view of one of the boom advancing and retracting pneumatic cylinders.
Figure 7:
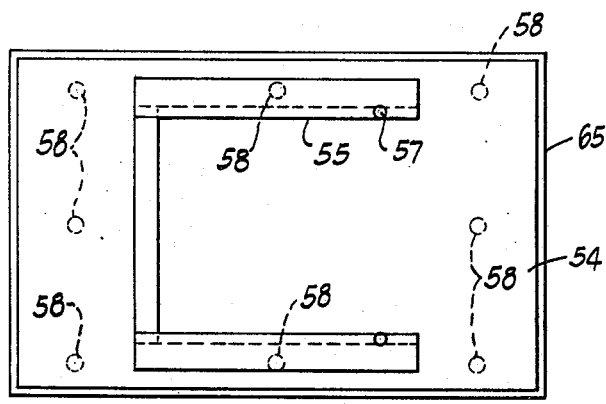
FIGURE 7 is a top plan view of the template, in its unmounted condition.
Figure 8:
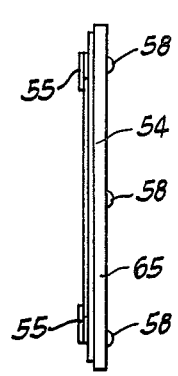
FIGURE 8 is a right end view of the same.

The pneumatic cylinders 42 and 43 operate on the socalled, triple air principal, with their pistons 46 dividing the cylinders into two compartments 68 and 69, as seen in FIGURE 6.

Compressed air admitted into compartment 69, through air line 49, acts to move the piston 46 forward, to move the boom 38 outwardly of the carriage 33.

To retract the boom 38 in carriage 33, compressed air is continuously admitted into chamber 68, through air line 48.

An air-bleeder vent 47, in the wall of compartment 68, allows air to escape to the atmosphere, to maintain the retractive thrust uniform as the boom 38 moves inwardly and outwardly in the carriage, in following the contour of a template 54, to be described hereinafter. The vent has a diameter of $\frac{1}{32}''$.

A carbide cutting tool 50, and its driving motor 51, are mounted at the forward end of the boom 38. Reference numeral 53 indicates a cam follower roller journaled co-axially of the tool 50 on the boom.

Figure 9:
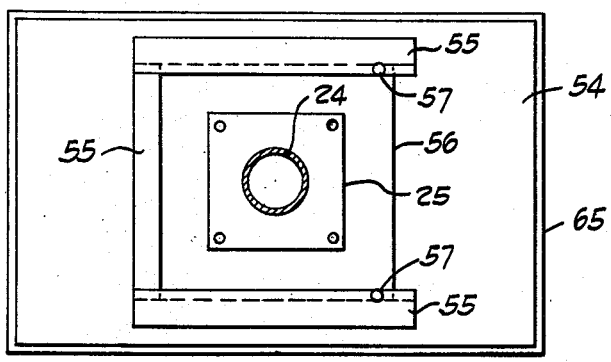
FIGURE 9 is a horizontal view of the mounted template, taken along the line and in the direction of the arrows 9—9 of FIGURE 1.

A template mounting plate 56 is mounted on the underside of the plate 25 at the bottom of the post 24, as seen in FIGURES 4 and 9. A flat template 54 is removably mounted on the underside of the plate 56, through a three sided slotted frame 55 that slidably interfits the mounting plate 56. The so mounted template is locked in place by two pins 57 that pass through aligned holes in the plate 56 and frame 55, as seen in FIGURE 9.

The template 54 has a plurality of semi-spherical, resilient feet 58 on the underside thereof. The template 54 has a camming edge 65 whose configuration is calculated to provide an opening of the desired size and shape to be formed by the movement of the tool 50, when the machine is operated in the manner to be described hereinafter.

Rotation of the carriage 33 is effected by a drive shaft 29, including a slip-clutch 28, journaled in the bracket arm 17, having a pinion 31, at the lower end thereof, which meshes with the ring gear 30, as seen in FIGURES 1 and 2. The shaft 29 is driven by a motor 26, mounted on top of the bracket 14, through a "Zerox-Max" unit 27 and a 12:1 right-angle speed reducer 32.

Reference numeral 62 indicates a vertical-thrust clamp, mounted on the upper end of the piston rod 64 of a pneumatic cylinder 63 located in an opening 70 in the table 12, aligned with the post 24 of the bracket 14, as again seen in FIGURE 1.

The operation of the machine is as follows:

The bracket 14 is moved upward to its first, or raised position, by activating the bracket pneumatic cylinders 18 and 19, as seen in FIGURE 1.

The boom 38 is moved outwardly of the carriage to its maximum extended position by admitting compressed air to the rear compartments 69 of the boom positioning cylinders 42 and 43.

Air pressure at only 15 p.s.i. is used for this, so that accidental contact by the forward end of the boom with the operator will cause no injury.

A template 54, of the desired configuration is slid on to the plate 56, and locked in place by means of the pins 57.

To form a rectangular opening with curved corners of 1½" radius, as indicated by reference numeral 61 in FIGURE 2, a rectangular template 54 with square corners is used. To provide corners of 1½" radius, the cam follower roller 53 must have a diameter of 3". It is of course to be understood that by suitable variations in the template configuration, and the diameter of the cam roller 53, openings having any desired contour may be produced.

The boom 38 is then retracted in the carriage 33, until the cam follower roller 53 is pressed against the cam edge 65 of the template 54, by continuously admitting compressed air at 30 p.s.i. to compartments 68 of the pneumatic cylinders 42 and 43. At the same time a small stream of air will continuously escape from the air-bleeder vents 47 of compartments 68, for a purpose to be revealed hereinafter.

The work-piece 60, in this case a plywood counter-top having a decorative sheet of plastic cemented to its upper face and edges, is laid on the table 12 with its rear edge positioned against the table back guide 59. At the same time the area of the opening to be cut therethrough is centered in line with the axis of the post 24. The cutter motor is started, causing the cutter 50 to revolve in a clock-wise direction. Then the pneumatic cylinders 18 and 19 are activated to pull the bracket 14 downward until the template feet 58 press firmly against the top surface of the work-piece 60. At the same time the tool 50 will have cut a hole through the work-piece.

The pneumatic cylinder 63 is then activated, pushing the clamp 62 upward to its second, or raised, position 62a, into pressed engagement with the under-side of the work-piece 60. The work-piece 60 is now immovably clamped in place on the table 12, between the clamp 62a and the template 54a, as seen in FIGURE 1.

The carriage rotating motor 26 is then started, causing the carriage 33 to rotate in a counter clock-wise direction.

The cam follower roller 55, at the outer end of the boom 38, will travel along the template camming surface 65, while at the same time the revolving cutter 50, centered therein, will cut a linear slot 61 through the work-piece 1½" beyond the face of the template camming surface 65, as seen in FIGURE 2.

As the carriage continues to revolve, the cam follower roller 53 is uniformly and constantly pulled inward against the template cam surface 65 by the pneumatic cylinders 42 and 43.

A study of FIGURE 2 shows that when the cam follower roller is at the corner of the template, in the positions identified as 53a, the boom, in dotted outline 38a, must extend far more from the post 24, its center of rotation, than it does at the position shown in full line, when the cam follower roller 53 is at its minimum distance from post 24.

Excessive frictional drag, due to the buildup of compression which would normally occur due to this variation in the radius of rotation of the cam follower roller, is prevented by the fact that increased compression of the air in chamber 68 is prevented by the proportional escape of air through the bleeder vents 47, thereby keeping the pressure in chamber 68 constantly at 30 p.s.i. This uniform pull on the cam follower roller 53, in all possible positions thereof could not be maintained if conventional metal springs were used.

As the cutting tool 50 is carried along by the boom 38 it may encounter variations in hardness of the plywood, due to knots, and the like; this is taken care of by the clutch 28, which is set to slip when resistence to the rotation of the boom and carriage reaches a pre-determined limit. At this point the rotation is slowed until the tool 50 has cut through the harder area.

Once started, the cutting operation continues, without attention, until the cam follower roller 53, and is associated cutting tool 50, have travelled entirely around the peripheral edge of the template and returned to their starting point, leaving a continuous slot 61, defining a work-piece opening having a cut-out blank 71 centered therein.

The pneumatic cylinders 18 and 19 are then activated to move the bracket 14 to its first, or raised position, wherein the template 54 is spaced upwardly and clear of the work-piece.

At the same time the removal of the downward pressure of the template on the cut-out blank 71 permits the clamp disc 62 to travel slightly upward, due to the pressure behind its supporting piston-rod 64, thereby raising the blank 71 slightly above the plane of the work-piece for easy removal, to reveal a perfectly formed opening of the desired area and shape.

As stated hereinabove the entire operation takes between 38 to 44 seconds, and is entirely automatic.

While the machine has been described as being used for forming sink bowl openings in counter-tops, it is to be understood that it can be used to form decorative opening of any size and shape, such as lites in solid doors, or any other flat panels.

By using appropriate cutting tools, such openings can be cut in any material, either soft or hard.

It will now be clear that there is provided a device which accomplishes the objectives heretofore set forth.

While the invention has been disclosed in its preferred form, it is to be understood that the specific embodiment thereof, as described and illustrated herein, is not to be considered in a limited sense as there may be other forms or modifications of the invention which should also be construed to come within the scope of the appended claims.

I claim:

1. An automatic hole router for forming completely enclosed sink-bowl openings in counter-tops, comprising in combination:
   (a) a horizontally extending workpiece supporting table having a vertically extending hollow column mounted at the rear edge thereof;
   (b) an inverted U-shaped bracket mounted cross-wise of the table with its rear arm telescopically fitted in the column and its forward arm centered over the table;
   (c) means for moving the bracket vertically, in the column, between a first position, wherein the bracket forward arm is spaced upwardly of the table, and a second position, wherein said arm is lowered toward the table;
   (d) a stationary cylindrical post mounted in the bracket forward arm, extending beyond the lower end thereof;
   (e) a bearing plate mounted at the lower end of the post, spaced downwardly of the lower end of the bracket forward arm;
   (f) a template mounting plate, mounted on the underside of the bearing plate;
   (g) a revolving, hollow, carriage journalled on the post, between the lower end of the bracket forward arm and the bearing plate;
   (h) drive means mounted on the bracket, and connected to the carriage, for rotating the carriage in a horizontal plane, through 360°;
   (i) a template, having a continuous peripheral cam surface, removably mounted on the template mounting plate, immediately below the carriage; the under-side of the template being spaced from the top surface of a workpiece supported on the table, when the bracket is in its first position; the underside of the template being in pressed engagement with the top surface of a workpiece supported on the table, when the bracket is in its second position;
   (j) a boom telescopically mounted within the carriage, for reciprocal horizontal movement longitudinally thereof;
   (k) a dependent cutting tool, including a driving motor therefore, mounted at the forward end of the boom;
   (l) a cam-follower roller, mounted co-axially of the cutting tool, at the forward end of the boom;
   (m) a pair of pneumatic cylinders mounted, in tandem, on the carriage, having their piston rods connected to the boom, proximate the forward end thereof; each of said paired cylinders being divided by its piston head into a first, rear, compartment and a second, forward, compartment; the boom being moved outwardly of the carriage to a first, advanced, position, wherein the cam-follower roller is spaced from the template cam surface, when compressed air is admitted to the first compartments of said paired cylinders; the boom being moved inwardly of the carriage to a second, retracted position, wherein the cam-follower roller is held against the template cam surface, when compressed air is admitted to the second compartments of said paired cylinders;
   (n) each of said cylinder second compartments having a pressure equalizing bleeder vent in the wall thereof, whereby the retractive force is maintained constant, in all possible positions of the cam-follower roller as it moves along the template cam surface, while the boom is being maintained in its second position; the cutting tool acting to form a continuous linear slot in a workpiece supported on the table, defining a completely enclosed opening therethrough whose configuration is determined by the contour of the template cam surface, when the carriage is rotated, with the bracket and boom in their second positions.

2. An automatic hole router, as in claim 1, wherein the workpiece supporting table has an opening therethrough, aligned with the bracket post; a clamp disc mounted for vertical movement in the opening; and, means for moving the clamp disc between a first, retracted, position wherein the clamp is spaced downwardly of the table surface, and a second, raised position, wherein the clamp is in pressed engagement with the underside of a workpiece supported on the table, whereby said workpiece is maintained immovably in position between the template and clamp, when the bracket is in its second position.

3. An automatic router, as in claim 1, wherein the bracket raising and lowering means, comprises a pair of pneumatic cylinders mounted on the column with their piston rod ends connected to the bracket rear arm.

4. An automatic router, as in claim 1, wherein the carriage rotating means comprises a driving motor, mounted on the bracket, and connected to the carriage through a drive shaft, including a clutch, adapted to slip, when the reactive forces to the rotation of the carriage exceeds a pre-determined level.

References Cited
UNITED STATES PATENTS

| | | | |
|---|---|---|---|
| 1,855,528 | 4/1932 | Onrud | 144—144 |
| 2,652,866 | 9/1953 | Drain | 144—144.5 |
| 659,461 | 10/1900 | Van Norman | 90—13.2 |

DONALD R. SCHRAN, Primary Examiner

U.S. Cl. X.R.

90—13.2